US012679314B2

(12) United States Patent
Ma et al.

(10) Patent No.: US 12,679,314 B2
(45) Date of Patent: Jul. 14, 2026

(54) METHOD FOR BRAKE CONTROL OF VEHICLE, COMPUTER DEVICE, AND COMPUTER-READABLE STORAGE MEDIUM

(71) Applicant: Great Wall Motor Company Limited, Baoding (CN)

(72) Inventors: Longxing Ma, Baoding (CN); Xiaofeng Niu, Baoding (CN); Yingfu Zhang, Baoding (CN); Bo Xu, Baoding (CN); Xuejun Wang, Baoding (CN); Shiliang Zhang, Baoding (CN); Jiefu He, Baoding (CN)

(73) Assignee: GREAT WALL MOTOR COMPANY LIMITED, Baoding (CN)

( * ) Notice: Subject to any disclaimer, the term of this patent is extended or adjusted under 35 U.S.C. 154(b) by 569 days.

(21) Appl. No.: 18/002,412

(22) PCT Filed: Jun. 21, 2021

(86) PCT No.: PCT/CN2021/101312
§ 371 (c)(1),
(2) Date: Aug. 8, 2023

(87) PCT Pub. No.: WO2022/001730
PCT Pub. Date: Jan. 6, 2022

(65) Prior Publication Data
US 2025/0229751 A1      Jul. 17, 2025

(30) Foreign Application Priority Data

Jun. 30, 2020      (CN) .......................... 202010623234.7

(51) Int. Cl.
*B60T 7/22*          (2006.01)
*B60T 7/14*          (2006.01)
(Continued)

(52) U.S. Cl.
CPC .................. *B60T 7/22* (2013.01); *B60T 7/14* (2013.01); *B60T 8/171* (2013.01); *B60T 8/172* (2013.01);
(Continued)

(58) Field of Classification Search
CPC ... B60T 7/22; B60T 7/14; B60T 8/171; B60T 8/172; B60T 8/58; B60T 2201/024;
(Continued)

(56) References Cited

U.S. PATENT DOCUMENTS

2006/0208169 A1* 9/2006 Breed ..................... G01S 15/88
                                                              250/221
2007/0052530 A1   3/2007 Diebold et al.
2013/0261869 A1   10/2013 Brenneis et al.

FOREIGN PATENT DOCUMENTS

CN          101151178 A      3/2008
CN          101734215 A      6/2010
(Continued)

OTHER PUBLICATIONS

Machine Translation of CN109606259A PDF File Name: "CN109606259A_Machine_Translation.pdf" (Year: 2019).*

(Continued)

*Primary Examiner* — Grant Moubry
*Assistant Examiner* — Ruben Picon-Feliciano
(74) *Attorney, Agent, or Firm* — RENNER, OTTO, BOISSELLE & SKLAR, LLP

(57)                    ABSTRACT
A method for a brake control of a vehicle is provided. This method includes: obtaining a collision type of a current vehicle after the current vehicle is collided; obtaining driving information of the current vehicle according to the collision type; determining whether the current vehicle is in a safe state according to the driving information; obtaining driving parameter information of the current vehicle, and determining a consciousness state of a driver according to
(Continued)

A collision type of a current vehicle is obtained after the current vehicle is collided ~ 101

Driving information of the current vehicle is obtained according to the collision type ~ 102

103
Whether the current vehicle is in a safe state according to the driving information — No Yes Driving parameter information of the current vehicle is obtained, and a consciousness state of a driver is determined according to the driving parameter information ~ 104

105
Whether the consciousness state is a non-rational state — No

Yes

The current vehicle is controlled to be stopped by braking ~ 106

107 ~ The driving operation information of the driver is obtained, and the current vehicle is controlled according to the driving operation information the driving parameter information when the current vehicle is determined as being in the safe state; and controlling the current vehicle to perform a brake operation when the consciousness state is determined as the non-rational driving state. According to this method, a problem of disabling of the driver's beneficial subjective risk-avoidance operations can be avoided, the secondary collision can be effectively avoided, and the damage to the vehicle due to the collision is alleviated.

13 Claims, 3 Drawing Sheets

(51) Int. Cl.
B60T 8/171 (2006.01)
B60T 8/172 (2006.01)
B60T 8/58 (2006.01)

(52) U.S. Cl.
CPC ........... B60T 8/58 (2013.01); B60T 2201/024 (2013.01); B60T 2210/32 (2013.01); B60T 2220/00 (2013.01); B60T 2220/03 (2013.01); B60T 2250/00 (2013.01); B60T 2250/04 (2013.01)

(58) Field of Classification Search
CPC ............. B60T 2210/32; B60T 2220/00; B60T 2220/03; B60T 2250/00; B60T 2250/04
See application file for complete search history.

(56) References Cited

FOREIGN PATENT DOCUMENTS

| CN | 102001359 | A | | 4/2011 | |
| CN | 202686252 | U | | 1/2013 | |
| CN | 203558055 | U | * | 4/2014 | |
| CN | 105939906 | A | | 9/2016 | |
| CN | 106809195 | A | | 6/2017 | |
| CN | 108758429 | A | * | 11/2018 | |
| CN | 109131277 | A | | 1/2019 | |
| CN | 109606259 | A | * | 4/2019 | ............ B60Q 5/006 |
| CN | 109677369 | A | | 4/2019 | |
| CN | 110406531 | A | | 11/2019 | |
| CN | 111731243 | A | | 10/2020 | |
| DE | 102009002375 | A1 | | 10/2010 | |
| DE | 102016207284 | A1 | | 11/2017 | |
| DE | 102016224041 | A1 | | 6/2018 | |
| JP | 2005254943 | A | | 9/2005 | |
| JP | 2016020106 | A | | 2/2016 | |
| KR | 20190113217 | A | | 10/2019 | |
| WO | WO-2019042374 | A1 | * | 3/2019 | ............ B60K 37/00 |

OTHER PUBLICATIONS

Machine Translation of CN108758429A PDF File Name: "CN108758429A_Machine_Translation.pdf" (Year: 2018).*
Machine Translation of WO2019042374A1 PDF File Name: "WO2019042374A1_Machine_Translation.pdf" (Year: 2019).*
Machine Translation of CN203558055U PDF File Name: "CN203558055U_Machine_Translation.pdf" (Year: 2014).*
International Search Report and Written Opinion for corresponding Application No. PCT/CN2021/101312 issued Sep. 26, 2021, with English translation.
Extended European Search Report for corresponding Application No. EP 21 83 4340, issued Dec. 5, 2023.

* cited by examiner

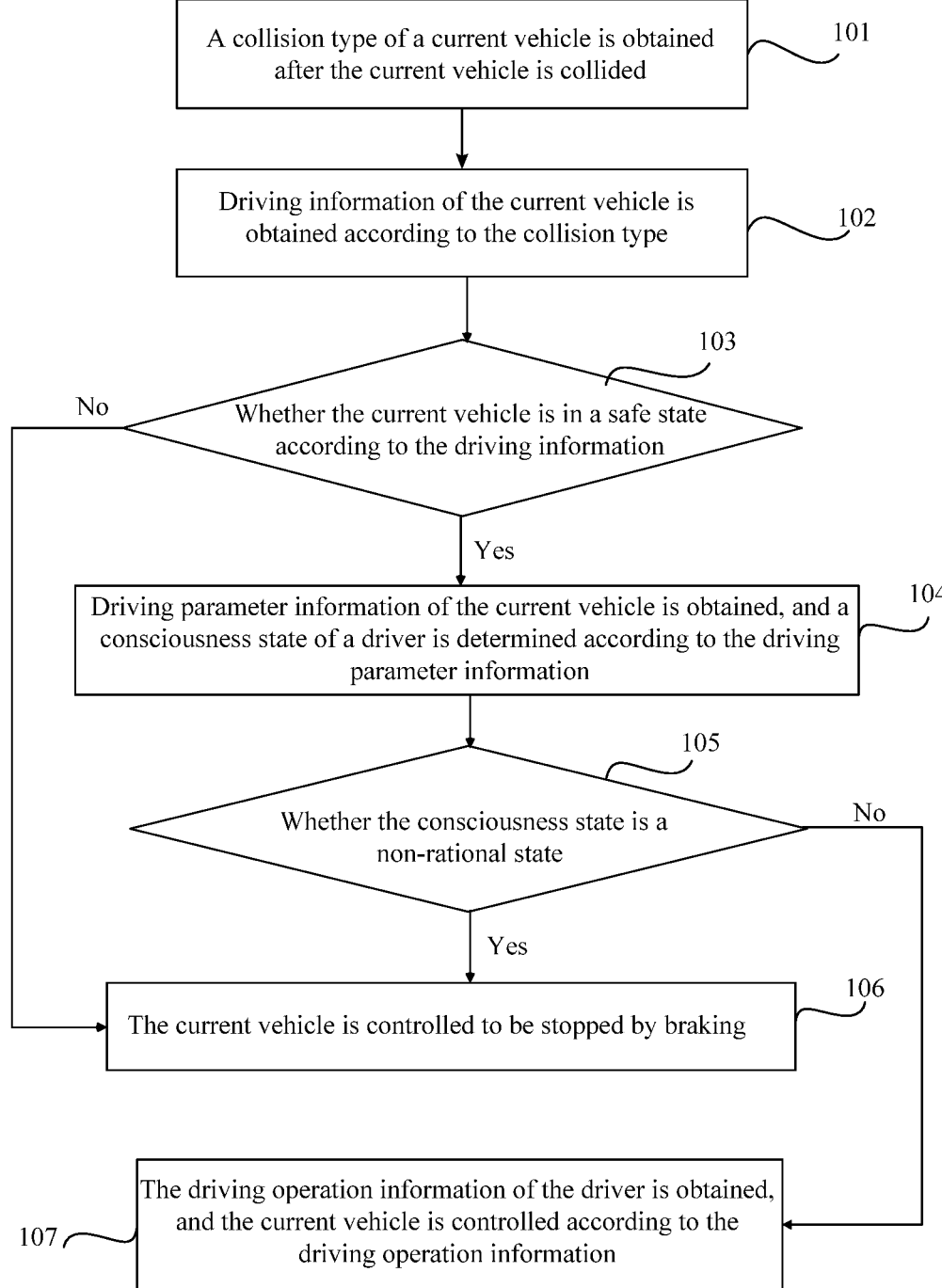

A collision type of a current vehicle is obtained after the current vehicle is collided — 101

Driving information of the current vehicle is obtained according to the collision type — 102

Whether the current vehicle is in a safe state according to the driving information — 103

No

Yes

Driving parameter information of the current vehicle is obtained, and a consciousness state of a driver is determined according to the driving parameter information — 104

Whether the consciousness state is a non-rational state — 105

No

Yes

The current vehicle is controlled to be stopped by braking — 106

The driving operation information of the driver is obtained, and the current vehicle is controlled according to the driving operation information — 107

FIG. 1

METHOD FOR BRAKE CONTROL OF VEHICLE, COMPUTER DEVICE, AND COMPUTER-READABLE STORAGE MEDIUM

CROSS-REFERENCE TO RELATED APPLICATIONS

This application is a National Stage Application filed under 35 USC 371 of International Patent Application No. PCT/CN2021/101312 with an international filing date of Jun. 21, 2021, which is based upon and claims priority to Chinese patent application No. 202010623234.7 filed on Jun. 30, 2020, and entitled "method and apparatus for brake control of vehicle, and vehicle", the contents of which are incorporated herein by reference in entirety.

FIELD

The present disclosure relates to the technical field of vehicles, and particularly to a method for a brake control of a vehicle, a computer device, and a computer-readable storage medium.

BACKGROUND

Generally, in order to improve a safety performance of a vehicle and avoid a secondary collision of the vehicle after the vehicle is collided for the first time, the vehicle is usually provided with a secondary collision mitigation function, so that the damage to the vehicle caused due to the second collision can be avoided or alleviated.

The existing second collision mitigation function is usually implemented by blocking the driver's driving operations after an occurrence of a vehicle collision, that is, the current second collision mitigation function directly controls the vehicle to be stopped by braking without considering the impact of the driver's active intervention on the mitigation of the collision. However, in many collision conditions, a direct braking is not conducive to mitigating the damage to the vehicle caused by the collision. Moreover, since the existing secondary collision mitigation function disables the function of the driver's active intervention on the mitigation of the second collision, so that subjective risk-avoidance operations performed by some experienced drivers cannot be finally implemented during a risk-avoidance process, and the corresponding functions of the driver's subjective risk-avoidance operations are disabled during the process of the second collision. In other words, the existing secondary collision mitigation function cannot maximize the mitigation of the damage caused by the collision, nor does it realizes the functions of the driver's beneficial subjective risk-avoidance operations in the process of avoidance of the secondary collision.

SUMMARY

One objective of the present disclosure is to provide a method for a brake control of a vehicle, a computer device, and a non-transitory computer-readable storage medium, which aims to solve a technical problem in the related art that the existing secondary collision mitigation function cannot maximize the mitigation of the damage caused by the collision, nor does it realizes the functions of the driver's beneficial subjective risk-avoidance operations in the process of avoidance of the secondary collision.

In order to achieve the aforesaid objective, in a first aspect, a method for a brake control of a vehicle is provided in the present disclosure, the method includes:

obtaining a collision type of a current vehicle after the current vehicle is collided;

obtaining driving information of the current vehicle according to the collision type;

determining whether the current vehicle is in a safe state according to the driving information;

obtaining driving parameter information of the current vehicle, and determining a consciousness state of a driver according to the driving parameter information when the current vehicle is determined as being in the safe state; the consciousness state includes a non-rational driving state and a rational driving state; and controlling the current vehicle to perform a brake operation when the consciousness state is determined as the non-rational driving state.

In some embodiments, the driving information includes a current speed of the current vehicle if the collision type is a rear collision; said determining whether the current vehicle is in the safe state according to the driving information includes:

determining a safety distance of the current vehicle according to the current speed;

obtaining a current distance between the current vehicle and a front vehicle;

determining that the current vehicle is in an unsafe state if the current distance is less than or equal to the safety distance; or determining that the current vehicle is in the safe state if the current distance is greater than the safety distance.

In some embodiments, said determining the safety distance of the current vehicle according to the current speed includes:

obtaining a preset deceleration;

determining a target distance traveled by the vehicle having the current speed under an action of the preset deceleration; and determining the target distance as the safety distance.

In some embodiments, when the collision type is a left-side collision or a right-side collision, the driving information includes a rotation direction of a steering wheel of the current vehicle and an ambient environment information of the current vehicle; said determining whether the current vehicle is in the safe state according to the driving information includes:

determining, when the collision type is the left-side collision, that the current vehicle is in the unsafe state if the ambient environment information indicates an existence of an obstacle excepting the current vehicle in a first preset area on a right side of the current vehicle, and the rotation direction is determined as a rightward rotation; or determining that the current vehicle is in the safe state, if the ambient environment information indicates a non-existence of the obstacle excepting the current vehicle in the first preset area on the right side of the current vehicle, and the rotation direction is determined as the rightward rotation;

determining, when the collision type is the right-side collision, that the current vehicle is in the unsafe state if the ambient environment information indicates that the obstacle exists in a second preset area on a left side of the current vehicle, and the rotation direction is determined as a leftward rotation; or determining that the current vehicle is in the safe state, if the ambient environment information indicates that the obstacle does not exist in the second preset area on the left side of the current vehicle, and the rotation direction is determined as the leftward rotation.

In some embodiments, when the collision type is a front collision, the driving information includes a current speed of the current vehicle; said determining whether the current vehicle is in the safe state according to the driving information includes:

determining that the current vehicle is in the safe state if the current speed is equal to zero;

or alternatively determining that the current vehicle is in the unsafe state if the current speed is not equal to zero.

In some embodiments, said determining the consciousness state of the driver according to the driving parameter information includes:

determining a driving-parameter-variation-rate according to the driving parameter information;

determining that the driver is in the non-rational driving state when the driving-parameter-variation-rate is greater than or equal to a preset variable quantity threshold value; or determining that the driver is in the rational driving state when the driving-parameter-variation-rate is less than the preset variable quantity threshold value.

In some embodiments, the method further includes:

controlling the current vehicle to perform the brake operation when the current vehicle is determined as being in the unsafe state.

In a second aspect, a computer device is provided in the present disclosure, the computer device includes:

a memory which stores a computer-readable program code; and at least one processor. When the computer-readable program code is executed by the at least one processor, the computer device is configured to perform the method for the brake control of the vehicle.

In a third aspect, a non-transitory computer-readable storage medium is provided in the embodiments of the present disclosure, the computer-readable storage medium stores a computer program, that, when executed by at least one processor of a computer device, causes the at least one processor of the computer device to perform the method for the brake control of the vehicle.

According to the aforesaid technical solutions, the safety state of the vehicle is determined according to the combination of the collision type and the driving information of the current vehicle after the current vehicle is collided. The current vehicle is controlled to be stopped by braking if the current vehicle is determined as being in the safe state and if the driver is in the non-rational driving state. Due to this reason, the impact of the driving information of the current vehicle and the state of consciousness of the driver on the occurrence of the secondary collision can be considered comprehensively, a problem of disabling of the driver's beneficial subjective risk-avoidance operation can be avoided. Thus, the secondary collision can be flexibly and effectively avoided, and the damage to the vehicle caused due to the first collision can be alleviated.

Other features and advantages of the present disclosure will be described in detail in the detailed description of embodiments hereinafter.

BRIEF DESCRIPTION OF DRAWINGS

The aforesaid aspects and/or additional aspects of the present disclosure and the benefits will be obvious and more understandable from the following descriptions of the embodiments with reference to the accompanying figures.

FIG. 1 is a schematic flow diagram of a method for a brake control of a vehicle as illustrated in one exemplary embodiment of the present disclosure;

DESCRIPTION OF EMBODIMENTS

Figure 2:
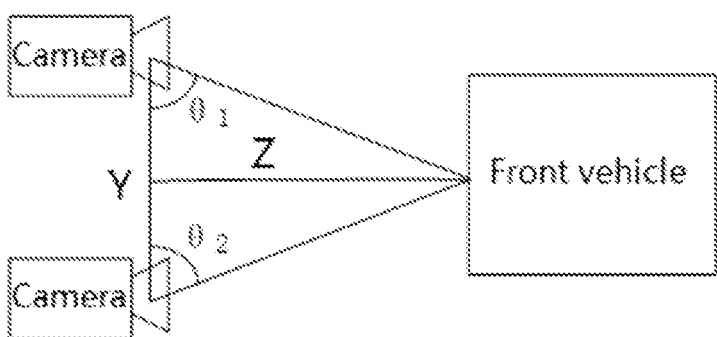
FIG. 2 illustrates a schematic flow diagram of determination of a current distance as illustrated in one exemplary embodiment of the present disclosure.

Herein, embodiments of the present disclosure are described in detail, and examples of the embodiment are illustrated in the accompanying figures. An always unchanged reference number or similar reference numbers represent(s) identical or similar components or components having identical or similar functionalities. The embodiment described below with reference to the accompanying figures is illustrative and intended to illustrate the present disclosure, but should not be considered as any limitation to the present disclosure.

Before introduction of the detailed descriptions of the embodiments of the present disclosure, an application scenario of the present disclosure is firstly described below. The present disclosure may be applied to a process of avoiding a secondary collision or mitigating a damage caused due to the secondary collision after a vehicle is collided. Where the vehicle may be a fuel vehicle, or be a pure electric vehicle, or be a hybrid vehicle. Currently, in order to avoid an occurrence of the secondary collision of the vehicle, vehicles are usually provided with a control device having a secondary collision mitigation function, this control device is used to avoid the occurrence of the secondary collision caused due to the impact of the driving environment or due to the improper driving operation for controlling the vehicle to be stopped by braking after the first collision. Generally, the damage caused due to the secondary collision can be reduced by controlling the vehicle to be stopped by braking in the event of an inevitable secondary collision. The secondary collision mitigation function involved in the related art usually disable the driver's driving operations after the first collision, in other words, the impact of the driver's active intervention on the mitigation of the collision is not considered, and the vehicle is directly controlled to be stopped by braking. Considering that a direct braking is not conducive to mitigating the damage of the collision to the vehicle under many collision conditions. For example, in the condition of a rear collision, if the vehicle is directly stopped by braking, the collided vehicle must absorb all collision energies, which is not conducive to mitigating the damage to the collided vehicle. Moreover, under the consideration that some experienced drivers usually perform some subjective risk-avoidance operations to be avoided from the risk of collision flexibly and effectively after the first collision, thereby effectively avoiding the secondary collision or reducing the damage caused due to the second collision. However, the secondary collision mitigation function in the related art can disable all driving operations of the driver, so that the function of the driver's beneficial subjective risk-avoidance operation cannot be implemented in the process of the secondary collision, and a flexibility of avoidance of the secondary collision cannot be improved.

In order to solve the aforesaid technical problem, a method for a brake control of a vehicle, a device, and a non-transitory computer-readable storage medium are provided in the present disclosure. According to this method, a safety state of the vehicle is determined according the collision type in combination with the driving information of the current vehicle after the current vehicle is collided. The current vehicle is controlled to be stopped by braking if the current vehicle is determined as being in the safe state and if the driver is in the non-rational driving state. Due to this reason, the impact of the driving information of the current vehicle and the state of consciousness of the driver on the occurrence of the secondary collision can be considered comprehensively, a problem of disabling of the driver's beneficial subjective risk-avoidance operation can be avoided. Thus, the secondary collision can be flexibly and effectively avoided, and the damage to the vehicle caused due to the collision can be alleviated.

FIG. 1 is a schematic flow diagram of a method for a brake control of a vehicle as illustrated in one exemplary embodiment of the present disclosure. With reference to FIG. 1, this method may include the following steps:

At a step of S101, a collision type of the current vehicle is obtained after the current vehicle is collided.

The collision type may include a front collision, a rear collision, a left side collision and a rear side collision. The collision type can be determined by pressure sensors arranged at different parts of the vehicle. For example, if a pressure sensor arranged at the rear of the vehicle detects a pressure signal, the collision type is determined as the rear collision. If a pressure sensor arranged at a left side of the vehicle detects a pressure signal, the collision type is determined as the left-side collision.

It should be noted that a plurality of implementation manners are used for determining the collision type in the prior art. Regarding the implementation manners for determining the collision type in the present disclosure, reference can be made to any implementation manner for determining the collision type in the prior art, so that the implementation manners for determining the collision type are not limited in the present disclosure.

At a step of S102, driving information of the current vehicle is obtained according to the collision type.

When the collision type is the rear collision or the front collision, the driving information includes a current speed of the current vehicle. When the collision type is the left-side collision or the right-side collision, the driving information includes a rotation direction of a steering wheel of the current vehicle and an ambient environment information of the current vehicle. The ambient environment information is used for indicating whether an obstacle excepting the current vehicle exists in a first preset area at the right side of the current vehicle. The ambient environment information is further used for indicating whether an obstacle excepting the current vehicle exists in a second preset area at the left side of the current vehicle.

At a step of S103, whether the current vehicle is in a safe state is determined according to the driving information.

When the collision type is the rear collision, the step S103 is implemented as follows: determining a safety distance of the current vehicle according to the current speed; obtaining a current distance between the current vehicle and a front vehicle; determining that the current vehicle is in a unsafe state if the current distance is less than or equal to the safety distance; or determining that the current vehicle is in the safe state if the current distance is greater than the safety distance.

It needs be noted that, when the rear collision is a rear collision between a rear vehicle and the vehicle tail of the current vehicle, the safety distance may be determined according to a method including: obtaining a preset deceleration;

determining a target distance traveled by the vehicle with the current speed under the action of the preset deceleration; and determining the target distance as the safety distance. The preset deceleration may be greater than or equal to a preset value of 0.6 g. Where, g represents the gravitational acceleration.

Exemplarily, if the current speed of the current vehicle after the collision is $V_1$, the preset deceleration is 0.6 g, and a response time of a preset driver is $t_1$ a time required for stopping the current vehicle is formulized as $$t = t_1 + \frac{V_1}{0.6\,g}.$$

and the target distance is formulized as $$S = V_1 \cdot t + \frac{1}{2} \cdot 0.6\,g \cdot \frac{(t - t_1)^2}{2},$$

so that the safety distance is obtained.

In one embodiment, the current distance is the distance between the current vehicle and the front vehicle at the current time, and the current distance may be determined by two methods described below:

In the first method, an included angle between the front vehicle and a binocular camera is recognized through the conventional binocular camera. Under the condition that the distance between the front vehicle and the binocular camera is known, the current distance is determined using a following formula.

Exemplarily, referring to FIG. 2, FIG. 2 is a schematic diagram of determination of the current distance as illustrated in one exemplary embodiment of the present disclosure. The included angles between the binocular camera and the front vehicle is $\theta_1$ and $\theta_2$, respectively, a mounting distance of the binocular cameras is Y, a current distance Z may be determined using the following formula:

$$Y = \frac{Z}{\tan \theta_1} + \frac{Z}{\tan \theta_2};$$

$$Z = \frac{Y \cdot (\tan \theta_1 \cdot \tan \theta_2)}{\tan \theta_1 + \tan \theta_2}.$$

In the second method, the current distance is directly measured through a radar arranged on the current vehicle. The detailed measurement manners of the radar can be referred to the implementation manners in the prior art, and thus are not limited in the present disclosure.

When the collision type is the left-side collision or the right-side collision, the step S103 is implemented as follows:

When the collision type is the left-side collision, the current vehicle is determined as being in the unsafe state if the ambient environment information indicates an existence of an obstacle excepting the current vehicle in a first preset area on a right side of the current vehicle, and the rotation direction is determined as a rightward rotation. The current vehicle is determined as being in the safe state if the ambient environment information indicates a non-existence of the obstacle excepting the current vehicle in the first preset area on the right side of the current vehicle, and the rotating direction is determined as the rightward rotation.

When the collision type is the right collision, the current vehicle is determined as being in the unsafe state if the ambient environment information indicates that an obstacle exist in a second preset area on a left side of the current vehicle, and the rotation direction is determined as the leftward rotation. The current vehicle is determined as being in the safe state if the ambient environment information indicates that an obstacle does not exist in the second preset area on the left side of the current vehicle, and the rotation direction is determined as the leftward rotation.

It should be noted that, the directions of the front, the rear, the left and the right in the present disclosure are determined by taking the direction of a heard of the vehicle as the front and taking the direction of the tail of the vehicle as the rear. The left-side collision refers to a collision of other vehicle with the left side of the current vehicle, the right-side collision refers to a collision of other vehicle with the right side of the current vehicle. The first preset area is an area coverage which has a distance to a vehicle door at the right side of the current vehicle of being less than or equal to a preset distance threshold value, the second preset area is an area coverage which has a distance to the vehicle door at the left side of the current vehicle of being less than or equal to the preset distance threshold value. When the collision type is the left-side collision, the driver usually performs an obstacle avoidance operation in a direction towards the right side of the vehicle. If an obstacle (including the vehicle and the obstacle other than the vehicle) exists in the first preset area, and the rotation direction of the steering wheel of the vehicle is the rightward rotation, an existence of a collision risk of the current vehicle with the obstacle is determined, that is, the current vehicle is in the unsafe state. If the obstacle does not exist in the first preset area and the rotation direction of the steering wheel of the vehicle is the rightward rotation, a non-existence of the collision risk of the current vehicle with the obstacle is determined, that is, the current vehicle is in the safe state. Similarly, when the collision type is the right-side collision, the driver usually performs an obstacle avoidance operation in a direction towards the left side of the vehicle. If an obstacle (including the vehicle and the obstacle other than the vehicle) exists in the second preset area, and the rotation direction of the steering wheel of the vehicle is the leftward rotation, an existence of a collision risk of the current vehicle with the obstacle is determined, that is, the current vehicle is in the unsafe state. If the obstacle does not exist in the second preset area and the rotation direction of the steering wheel is the leftward rotation, a non-existence of the collision risk of the current vehicle with the obstacle is determined, that is, the current vehicle is in the safe state.

When the collision type is the front collision, the step S103 is implemented as follows: determining that the current vehicle is in the safe state if the current speed is equal to zero; or alternatively determining that the current vehicle is in the unsafe state if the current speed is not equal to zero.

It needs be noted that, when the collision type is the front collision, it indicates that the current vehicle collides with the front vehicle. If the current vehicle is not stopped after the collision, it indicates that the current vehicle is in the unsafe state, and a forced brake operation needs to be performed to stop the current vehicle. If the current vehicle is stopped after the collision, it indicates that the current vehicle is in the safe state, and the forced brake operation is unnecessary.

In the step S103, when the current vehicle is determined as being in the safe state, a step S104 and a step S105 are performed subsequently; when the current vehicle is in the unsafe state, a step S106 is performed subsequently.

At the step S104, driving parameter information of the current vehicle is obtained, and a consciousness state of the driver is determined according to the driving parameter information.

The driving parameter information may include at least one of an accelerator pedal aperture, a brake pedal aperture, and a steering wheel angle.

The consciousness state includes a non-rational driving state and a rational driving state.

In some embodiments, this step S104 is implemented as follows: a driving-parameter-variation-rate is determined according to the driving parameter information. When the driving-parameter-variation-rate is greater than or equal to a preset variable quantity threshold value, the driver is determined as being in the non-rational driving state. When the driving-parameter-variation-rate is less than the preset variable quantity threshold value, the driver is determined as being in the rational driving state.

It needs to be noted that, when the driving parameter information includes the accelerator pedal aperture, the driving-parameter-variation-rate includes an accelerator-pedal-aperture-variation-rate, and the preset variable quantity threshold value includes a first preset threshold value. When the driving parameter information includes the brake pedal aperture, the driving-parameter-variation-rate includes a brake-pedal-aperture-variation-rate, and the preset variable quantity threshold value includes a second preset threshold value. When the driving parameter information includes the steering wheel rotation angle, the driving-parameter-variation-rate includes a steering wheel rotation angle variation rate, and the preset variable quantity threshold value includes a third preset threshold value.

Exemplarily, the variation rate of the accelerator pedal aperture can be determined by dividing the variable quantity of the accelerator pedal apertures collected two times by a time interval between two continuous collections of the accelerator pedal aperture. Similarly, the variation rate of the brake pedal aperture and the variation rate of the steering wheel angle can also be determined by dividing the variable quantity between two times of acquisition results by the time interval between two continuous acquisitions of the variation rate of the brake pedal aperture or the variation rate of the steering wheel angle.

In some embodiments, it can be determined that the driver has performed excessive operations if the variation rate of the driving parameter is greater than or equal to the preset variable quantity threshold value. Generally, a phenomenon of occurrence of excessive operations is prone to occur in the event that the driver is overstrained or get scared. Thus, the consciousness of the driver can be determined as the non-rational driving state. However, if the variation rate of the driving parameter is lower than the preset variable quantity threshold value, it indicates that the driver is not overstrained and can perform driving operation rationally. Thus, the consciousness of the driver can be determined as the rational driving state.

At a step of S105, whether the consciousness state of the driver is the non-rational driving state is determined.

In the step S105, when the consciousness state of the driver is determined as the non-rational driving state, a step S106 is performed subsequently. When the consciousness state of the driver is determined as the rational driving state, a step S107 is performed subsequently.

At the step of S106, the current vehicle is controlled to be stopped by braking.

In this step, the vehicle may be controlled to be stopped by braking by outputting a corresponding braking signal.

At the step of S107, driving operation information of the driver is obtained, and the current vehicle is controlled according to the driving operation information.

The driving operation information includes operation information such as the steering angle of the steering wheel, the brake pedal aperture, the accelerator pedal aperture, and the like.

According to the aforesaid technical solutions, the safety state of the vehicle is determined according to the combination of the collision type and the driving information of the current vehicle after the current vehicle is collided. The current vehicle is controlled to be stopped by braking if the current vehicle is determined as being in the safe state and if the driver is in the non-rational driving state. Due to this reason, the impact of the driving information of the current vehicle and the state of consciousness of the driver on the occurrence of the secondary collision can be considered comprehensively, the problem of disabling of the driver's beneficial subjective risk-avoidance operation can be avoided. Thus, the secondary collision can be flexibly and effectively avoided, and the damage to the vehicle caused due to the first collision can be alleviated.

In order to achieve the aforesaid embodiments, a computer device is further provided in the present disclosure, the computer device includes:

a memory which stores a computer-readable program code; and at least one processor configured to, when executing the computer-readable program code, perform the aforesaid method for the brake control of the vehicle.

In order to achieve the aforesaid embodiments, a computer program is further provided, the computer program includes a computer-readable program code, that, when executed by a computer device, causes the computer device to perform the aforesaid method for the brake control of the vehicle.

In order to achieve the aforesaid embodiments, a computer-readable storage medium is further provided, the computer-readable storage medium stores the computer program, that, when executed by the at least one processor of the computer device, causes the at least one processor of the computer device to perform the aforesaid method for the brake control of the vehicle.

Figure 3:
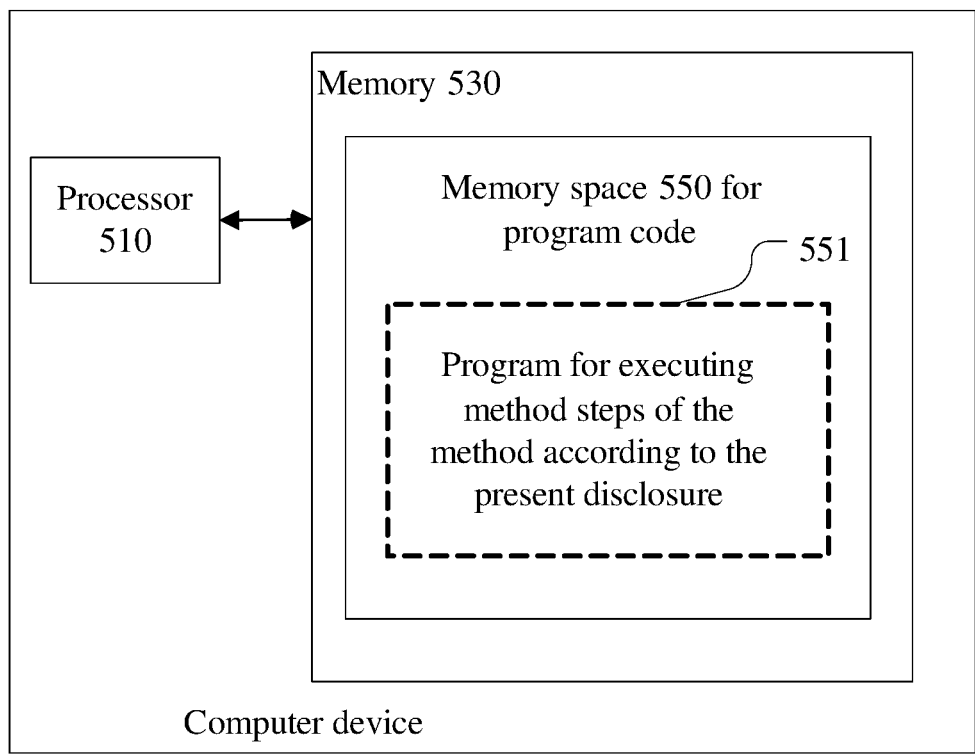
FIG. 3 is a schematic structural block diagram of a computer device according to one embodiment of the present disclosure.
Figure 4:
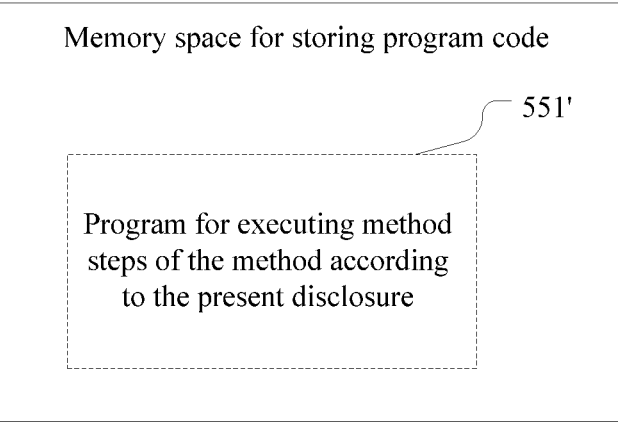
FIG. 4 is a schematic block diagram of a memory for portably or fixedly implementing a program code according to the method for the brake control of the vehicle of the present disclosure, according to one embodiment of the present disclosure.

FIG. 3 illustrates a schematic structural diagram of the computer device according to one embodiment of the present disclosure. The computer device generally includes a processor 510 and a computer program product or computer-readable medium in the form of memory 530. The memory 530 may be an electronic memory such as a flash memory, an electrically erasable programmable read-only memory (Electrically Erasable Programmable Read-Only Memory, EEPROM), an erasable programmable read-only memory (Erasable Programmable Read-Only Memory, EPROM), a hard disk, or a read-only memory (Read-Only Memory, ROM). The memory 530 has a storage space 550 for executing a program code 551 of the method steps in the method for the brake control of the vehicle. These program codes may be read out from one or more computer program products or be written into the one or more computer program products. These computer program products include a program code carrier such as a hard disk, a compact disc (Compact Disc, CD), a memory card, or a floppy disk. This computer program product is generally a portable or fixed memory unit as shown in FIG. 4. The memory unit may have a storage segment, or a storage space arranged in a manner similar to that of the memory 530 in a computer device of FIG. 3. The program code may be compressed, for example, the program code may be compressed in an appropriate form. Generally, the memory unit includes a computer-readable program code 551' (i.e., a code that can be read by a processor such as the processor 510), that, when executed by a computer device, causes the computer device to perform the various steps in the method for the brake control of the vehicle as described above.

In the description of the present application, the descriptions of the reference terms such as "one embodiment", "some embodiments", "example", "specific example" or "some examples" and the like means that the specific technical features, structures, materials or characteristics which are described with reference to the embodiments or the examples are included in at least one embodiment or example of the present application. In the description of the present application, a schematic expressions of the terms mentioned above don't necessarily aim at the same embodiment or example. Furthermore, the specific technical features, structures, materials, or characteristics described above may be combined in any suitable manner in any of one or a plurality of embodiments or examples. In addition, under the condition of without conflicting with each other, different embodiments or examples described in the description and the features in the different embodiments or examples may be integrated and combined by the person of ordinary skill in the art.

In addition, terms "the first" and "the second" are only used for description purposes, and should not be considered as indicating or implying any relative importance, or implicitly indicating the number of indicated technical features. As such, technical feature(s) restricted by "the first" or "the second" can explicitly or implicitly comprise one or more such technical feature(s). In the description of the present application, "a plurality of" has the meaning of at least two, such as two, three, and the like, unless there is additional explicit and specific limitation.

Any process or method described in the flowchart or described in other manner may be interpreted as a module of a code of an executable instruction of steps for realizing a customized logic function, a segment, or portion, and the scope of the preferable embodiments of the present disclosure includes additional implementations, the functions may be performed without following a depicted order or a discussed order including, in a substantially simultaneous manner or in a reverse order according to the involved functions. The aforesaid process or method should be understood by the person of ordinary skill in the art which the embodiments of the present disclosure pertain to.

The logic and/or steps represented in the flowcharts or described in other manner can be, for example, considered as a fixed sequence table of executable instruction for implementing logical functions, may be implemented in any computer-readable medium, and are used by an instruction execution system, an apparatus, or a device (e.g., a computer-based system, a system including a processor, or other systems that may obtain and execute instructions from the instruction execution system), or used in combination with the instruction execution system, the apparatus and the device. As for the specification, a "computer-readable medium" may be any device that can contain, store, communicate, propagate, or transmit a program so as to be used by the instruction execution system, the apparatus and the device or in combination with the instruction execution system, the apparatus and the device. More specific example (a non-exhaustive list) of the computer-readable medium include: an electrical connection part (e.g., electronic device) having one or more wires, a portable computer diskette (magnetic device), a random access memory (Random Access Memory, RAM), a read-only memory (Read-Only Memory, ROM), an erasable programmable read-only memory (Erasable Programmable Read-Only Memory, EPROM) or a flash memory, an optical fiber device, and a portable compact disc read-only memory (Compact Disc Read-Only Memory, CD-ROM). In addition, the computer-readable medium may even be a paper or other suitable medium on which the program can be printed, since the program can be obtained electronically, for example, the program can be obtained by optically scanning paper or other medium, then editing, interpreting, or otherwise processing when necessary, and then storing it in a computer memory.

It should be understood that the various parts of the present disclosure may be implemented by hardware, software, firmware, or a combination thereof. In the aforesaid embodiments, a plurality of steps or methods may be implemented by software or firmware stored in the memory and executed by suitable instruction execution system. For example, if the various parts of the present disclosure are implemented in hardware as is done in other embodiment, the parts of the present disclosure can be implemented with any one or the combination of the following techniques known in the art, which include: a discrete logic circuit having a logic gate circuit for implementing logic functions on data signals, an application specific integrated circuit (Application Specific Integrated Circuit, ASIC) having a suitable combinational logic gate circuit, a programmable gate array (Programmable Gate Array, PGA), a field programmable gate array (Field Programmable Gate Array, FPGA), etc.

A person of ordinary skill in the art may understand that all or some of the steps carried in the method of the embodiments may be implemented by a program instructing relevant hardware. This program may be stored in a computer-readable storage medium. When the program is executed, one or a combination of the steps of the method embodiment is included.

The storage medium mentioned above may be a ROM, a magnetic disc or an optical disk. Although the embodiments of the present application have been illustrated and described above, it should be understood that, the embodiments mentioned above are merely for illustrative, and shouldn't be interpreted as limitation to the present application. The embodiments may be changed, modified, replaced or transformed by one of ordinary skill in the art within the protection scope of the present disclosure.

What is claimed is:

1. A method for a brake control of a vehicle, implemented by a computer device, the method comprising:

obtaining a collision type of a current vehicle after the current vehicle is collided, wherein the collision type comprises a front collision, a rear collision, a left-side collision and a right-side collision;

obtaining driving information of the current vehicle according to the collision type;

determining whether the current vehicle is in a safe state according to the driving information;

obtaining driving parameter information of the current vehicle, and determining a consciousness state of a driver according to the driving parameter information when the current vehicle is determined as being in the safe state; wherein the consciousness state comprises a non-rational driving state and a rational driving state, the non-rational state refers to a state in which the driver is overstrained or scared and is prone to perform excessive operations and the rational state refers to a state in which the driver is not overstrained and can perform driving operation rationally; and controlling the current vehicle to perform a brake operation when the consciousness state is determined as the non-rational driving state;

wherein when the collision type is the left-side collision or the right-side collision, the driving information comprises a rotation direction of a steering wheel of the current vehicle and an ambient environment information of the current vehicle;

said determining whether the current vehicle is in the safe state according to the driving information comprises:

determining, when the collision type is the left-side collision, that the current vehicle is in an unsafe state if the ambient environment information indicates an existence of an obstacle excepting the current vehicle in a first preset area on a right side of the current vehicle, and the rotation direction is determined as a rightward rotation; or determining that the current vehicle is in the safe state, if the ambient environment information indicates a non-existence of the obstacle excepting the current vehicle in the first preset area on the right side of the current vehicle, and the rotation direction is determined as the rightward rotation;

or alternatively, determining, when the collision type is the right-side collision, that the current vehicle is in the unsafe state if the ambient environment information indicates that the obstacle exists in a second preset area on a left side of the current vehicle, and the rotation direction is determined as a leftward rotation; or determining that the current vehicle is in the safe state, if the ambient environment information indicates that the obstacle does not exist in the second preset area on the left side of the current vehicle, and the rotation direction is determined as the leftward rotation.

2. The method according to claim 1, wherein the driving information comprises a current speed of the current vehicle if the collision type is a rear collision;

said determining whether the current vehicle is in the safe state according to the driving information comprises:

determining a safety distance of the current vehicle according to the current speed;

obtaining a current distance between the current vehicle and a front vehicle;

determining that the current vehicle is in the unsafe state if the current distance is less than or equal to the safety distance;

or alternatively determining that the current vehicle is in the safe state if the current distance is greater than the safety distance.

3. The method according to claim 2, wherein said determining the safety distance of the current vehicle according to the current speed comprises:

obtaining a preset deceleration;

determining a target distance traveled by the vehicle having the current speed under an action of the preset deceleration; and determining the target distance as the safety distance.

4. The method according to claim 1, wherein when the collision type is a front collision, the driving information comprises a current speed of the current vehicle;

said determining whether the current vehicle is in the safe state according to the driving information comprises:

determining that the current vehicle is in the safe state if the current speed is equal to zero;

or alternatively determining that the current vehicle is in the unsafe state if the current speed is not equal to zero.

5. The method according to claim 1, wherein said determining the consciousness state of the driver according to the driving parameter information comprises:

determining a driving-parameter-variation-rate according to the driving parameter information;

determining that the driver is in the non-rational driving state when the driving-parameter-variation-rate is greater than or equal to a preset variable quantity threshold value;

or alternatively determining that the driver is in the rational driving state when the driving-parameter-variation-rate is less than the preset variable quantity threshold value.

6. The method according to claim 1, further comprising:

controlling the current vehicle to perform the brake operation when the current vehicle is determined as being in the unsafe state.

7. A computer device, comprising:

a memory which stores a computer-readable program code; and at least one processor;

wherein the at least one processor is configured to, when executing the computer-readable program code, implement operations for a brake control of a vehicle, comprising:

obtaining a collision type of a current vehicle after the current vehicle is collided, wherein the collision type comprises a front collision, a rear collision, a left-side collision and a right-side collision;

obtaining driving information of the current vehicle according to the collision type;

determining whether the current vehicle is in a safe state according to the driving information;

obtaining driving parameter information of the current vehicle, and determining a consciousness state of a driver according to the driving parameter information when the current vehicle is determined as being in the safe state; wherein the consciousness state comprises a non-rational driving state and a rational driving state, the non-rational state refers to a state in which the driver is overstrained or scared and is prone to perform excessive operations and the rational state refers to a state in which the driver is not overstrained and can perform driving operation rationally; and controlling the current vehicle to perform a brake operation when the consciousness state is determined as the non-rational driving state;

wherein when the collision type is the left-side collision or the right-side collision, the driving information comprises a rotation direction of a steering wheel of the current vehicle and an ambient environment information of the current vehicle;

the at least one processor is further configured to perform the operation of determining whether the current vehicle is in the safe state according to the driving information by:

determining, when the collision type is the left-side collision, that the current vehicle is in an unsafe state if the ambient environment information indicates an existence of an obstacle excepting the current vehicle in a first preset area on a right side of the current vehicle, and the rotation direction is determined as a rightward rotation; or determining that the current vehicle is in the safe state, if the ambient environment information indicates a non-existence of the obstacle excepting the current vehicle in the first preset area on the right side of the current vehicle, and the rotation direction is determined as the rightward rotation;

or alternatively, determining, when the collision type is the right-side collision, that the current vehicle is in the unsafe state if the ambient environment information indicates that the obstacle exists in a second preset area on a left side of the current vehicle, and the rotation direction is determined as a leftward rotation; or determining that the current vehicle is in the safe state, if the ambient environment information indicates that the obstacle does not exist in the second preset area on the left side of the current vehicle, and the rotation direction is determined as the leftward rotation.

8. The computer device according to claim 7, wherein the driving information comprises a current speed of the current vehicle if the collision type is a rear collision;

the at least one processor is further configured to perform the operation of determining whether the current vehicle is in the safe state according to the driving information by:

determining a safety distance of the current vehicle according to the current speed;

obtaining a current distance between the current vehicle and a front vehicle; and determining that the current vehicle is in the unsafe state if the current distance is less than or equal to the safety distance;

or alternatively determining that the current vehicle is in the safe state if the current distance is greater than the safety distance.

9. The computer device according to claim 8, wherein the at least one processor is further configured to perform the operation of determining the safety distance of the current vehicle according to the current speed by:

obtaining a preset deceleration;

determining a target distance traveled by the vehicle having the current speed under an action of the preset deceleration; and determining the target distance as the safety distance.

10. The computer device according to claim 7, wherein when the collision type is a front collision, the driving information comprises a current speed of the current vehicle;

the operation of determining whether the current vehicle is in the safe state according to the driving information comprises:

determining that the current vehicle is in the safe state if the current speed is equal to zero;

or alternatively determining that the current vehicle is in the unsafe state if the current speed is not equal to zero.

11. The computer device according to claim 7, wherein the at least one processor is further configured to perform the operation of determining the consciousness state of the driver according to the driving parameter information by:

determining a driving-parameter-variation-rate according to the driving parameter information;

determining that the driver is in the non-rational driving state when the driving-parameter-variation-rate is greater than or equal to a preset variable quantity threshold value;

or alternatively determining that the driver is in the rational driving state when the driving-parameter-variation-rate is less than the preset variable quantity threshold value.

12. The computer device according to claim 7, wherein the at least one processor is further configured to perform an operation of controlling the current vehicle to perform the brake operation when the current vehicle is determined as being in the unsafe state.

13. A non-transitory computer-readable storage medium, which stores a computer-readable program code, that, when executed by at least one processor of a computer device, causes the at least one processor of the computer device to perform a method for the brake control of the vehicle, comprising steps of:

obtaining a collision type of a current vehicle after the current vehicle is collided, wherein the collision type comprises a front collision, a rear collision, a left-side collision and a right-side collision;

obtaining driving information of the current vehicle according to the collision type;

determining whether the current vehicle is in a safe state according to the driving information;

obtaining driving parameter information of the current vehicle, and determining a consciousness state of a driver according to the driving parameter information when the current vehicle is determined as being in the safe state; wherein the consciousness state comprises a non-rational driving state and a rational driving state, the non-rational state refers to a state in which the driver is overstrained or scared and is prone to perform excessive operations and the rational state refers to a state in which the driver is not overstrained and can perform driving operation rationally; and controlling the current vehicle to perform a brake operation when the consciousness state is determined as the non-rational driving state;

wherein when the collision type is the left-side collision or the right-side collision, the driving information comprises a rotation direction of a steering wheel of the current vehicle and an ambient environment information of the current vehicle;

the at least one processor is further configured to perform the operation of determining whether the current vehicle is in the safe state according to the driving information by:

determining, when the collision type is the left-side collision, that the current vehicle is in an unsafe state if the ambient environment information indicates an existence of an obstacle excepting the current vehicle in a first preset area on a right side of the current vehicle, and the rotation direction is determined as a rightward rotation; or determining that the current vehicle is in the safe state, if the ambient environment information indicates a non-existence of the obstacle excepting the current vehicle in the first preset area on the right side of the current vehicle, and the rotation direction is determined as the rightward rotation;

or alternatively, determining, when the collision type is the right-side collision, that the current vehicle is in the unsafe state if the ambient environment information indicates that the obstacle exists in a second preset area on a left side of the current vehicle, and the rotation direction is determined as a leftward rotation; or determining that the current vehicle is in the safe state, if the ambient environment information indicates that the obstacle does not exist in the second preset area on the left side of the current vehicle, and the rotation direction is determined as the leftward rotation.

* * * * *